United States Patent
Liang et al.

(10) Patent No.: US 9,755,395 B2
(45) Date of Patent: Sep. 5, 2017

(54) RING LASER OPTICAL SYSTEM

(71) Applicant: Hewlett Packard Enterprise Development LP, Houston, TX (US)

(72) Inventors: Di Liang, Santa Barbara, CA (US); Raymond G. Beausoleil, Seattle, WA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/107,932

(22) PCT Filed: Jan. 24, 2014

(86) PCT No.: PCT/US2014/012872
§ 371 (c)(1),
(2) Date: Jun. 24, 2016

(87) PCT Pub. No.: WO2015/112157
PCT Pub. Date: Jul. 30, 2015

(65) Prior Publication Data
US 2016/0322774 A1    Nov. 3, 2016

(51) Int. Cl.
*H01S 3/14*    (2006.01)
*H01S 3/083*   (2006.01)
(Continued)

(52) U.S. Cl.
CPC .............. *H01S 3/083* (2013.01); *H01S 3/005* (2013.01); *H01S 3/0637* (2013.01);
(Continued)

(58) Field of Classification Search
CPC ... H01S 3/13; H01S 3/04; H01S 3/083; H01S 3/23; H01S 3/10053; G02B 6/12
(Continued)

(56) References Cited

U.S. PATENT DOCUMENTS 5,469,460 A     11/1995  Van Roijen et al.
2009/0122817 A1*  5/2009  Sato ................... G02B 6/12007
                                               372/20
(Continued)

FOREIGN PATENT DOCUMENTS

JP    2008-066318 A    3/2008
KR    2011-0066625 A   6/2011
WO    WO-02089272     11/2002

OTHER PUBLICATIONS

Choi, S.J. et al., A Semiconductor Tunable Laser Using a Wavelength Selective Reflector Based on Ring Resonators, Mar. 6-11, 2005.
(Continued)

*Primary Examiner* — Tuan Nguyen
(74) *Attorney, Agent, or Firm* — Tarolli, Sundheim, Covell & Tummino L.L.P.

(57) ABSTRACT

An optical system includes an output waveguide to propagate an optical output signal and a plurality of ring laser systems. Each of the plurality of ring laser systems includes a ring laser to generate a ring laser optical signal and a local waveguide. The ring laser can be optically coupled to the output waveguide to provide a first portion of the ring laser optical signal on the output waveguide as part of the optical output signal, and can be optically coupled to the local waveguide to provide a second portion of the ring laser optical signal on the local waveguide. Each of the plurality of ring laser systems can be to control a phase of the second portion of the ring laser optical signal to provide constructive interference with the ring laser optical signal at an optical coupling of the ring laser and the local waveguide.

14 Claims, 3 Drawing Sheets

(51) Int. Cl.
*H01S 3/063* (2006.01)
*H01S 3/13* (2006.01)
*H01S 3/23* (2006.01)
*H01S 3/00* (2006.01)
*H01S 3/10* (2006.01)
H01S 3/082 (2006.01)
H01S 3/137 (2006.01)

(52) U.S. Cl.
CPC ........ *H01S 3/10053* (2013.01); *H01S 3/1305* (2013.01); *H01S 3/1307* (2013.01); *H01S 3/2391* (2013.01); H01S 3/082 (2013.01); H01S 3/137 (2013.01)

(58) Field of Classification Search
USPC .............................................. 385/14; 372/21
See application file for complete search history.

(56) References Cited

U.S. PATENT DOCUMENTS

2009/0285251 A1* 11/2009 Yamazaki .......... G02B 6/12007
372/34
2010/0034224 A1   2/2010 Takabayashi et al.
2011/0013654 A1   1/2011 Yamazaki
2013/0016423 A1   1/2013 Zheng et al.

OTHER PUBLICATIONS

International Search Report & Written Opinion received in PCT Application No. PCT/US2014/012872, Oct. 22, 2014, 21 pages.

* cited by examiner

RING LASER OPTICAL SYSTEM

BACKGROUND

Optical communications have become more prevalent as the demand for high-speed communication and processing has increased. Optical communications typically implement a laser for providing an optical signal. As an example, a laser array can provide a plurality of individual optical signals onto a common optical bus, each having a separate channel, to provide optical data on the optical bus. One example of a laser is a ring laser that is configured to generate an optical signal that propagates therein in response to a lasing signal (e.g., an electrical or optical lasing signal). As an example, for a given lasing stimulation (e.g., injection current), light in a ring laser cavity can travel unidirectionally, either in a clockwise direction or a counter-clockwise direction, which cannot typically be predicted and can be opposite a desired direction, and which can change at different amplitudes of lasing stimulation. As another example, light can sometimes travel bidirectionally (i.e., in both directions simultaneously) in response to a given lasing stimulation. In many applications (e.g., optical communication systems), it may be necessary to provide unidirectional lasing to a desired direction.

DETAILED DESCRIPTION

Figure 1:
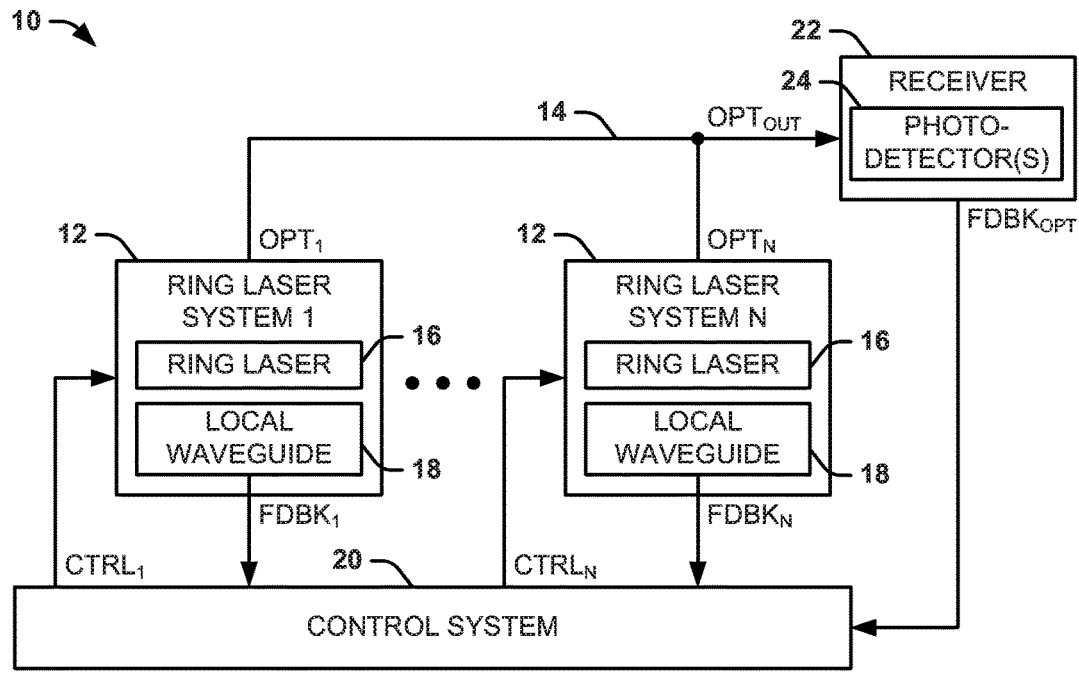
FIG. 1 illustrates an example of an optical system.

FIG. 1 illustrates an example of an optical system 10. As an example, the optical system 10 can be implemented in an optical communication system. The optical system 10 includes a plurality N of ring laser systems 12, where N is a positive integer, that are each optically coupled to an output waveguide 14 that is configured to propagate an optical output signal $OPT_{OUT}$. Each of the ring laser systems 12 includes a ring laser 16 and a local waveguide 18. The ring laser 16 can be optically coupled to each of the output waveguide 14 and the local waveguide 18. For example, the optical coupling of the ring laser 16 can be respective evanescent couplings to each of the output waveguide 14 and the local waveguide 18.

The optical system 10 also includes a control system 20. The control system 20 is configured to generate a respective plurality N of sets of control signals CTRL that are provided to the respective ring laser systems 12. The control signals $CTRL_1$ through $CTRL_N$ can include respective electrical signals that can be provided to the ring laser 16 in each of the ring laser systems 12 to provide lasing of the ring lasers 16 to generate respective ring laser optical signals $OPT_1$ through $OPT_N$. Alternatively, the control signals $CTRL_1$ through $CTRL_N$ can include optical pump signals in lieu of electrical signals that can facilitate the lasing of the ring laser 16 in each of the ring laser systems 12. As an example, each of the ring lasers 16 can be dimensioned to provide the ring laser optical signals $OPT_1$ through $OPT_N$ at different respective wavelengths. For example, the control signals $CTRL_1$ through $CTRL_N$ can provide wavelength tuning of the respective ring laser optical signals $OPT_1$ through $OPT_N$.

Based on the optical (e.g., evanescent) coupling of the ring laser 16 of each of the ring laser systems 12 to the output waveguide 14, a first portion of each of the ring laser optical signals $OPT_1$ through $OPT_N$ can be provided on the output waveguide 14 to collectively form the optical output signal $OPT_{OUT}$.

In response to the control signals $CTRL_1$ through $CTRL_N$ lasing the ring lasers 16 to generate the respective ring laser optical signals $OPT_1$ through $OPT_N$, the direction of lasing of the ring lasers 12 (e.g., either clockwise or counter-clockwise or both) can be provided substantially randomly in the respective ring laser 12 based on the lasing via the respective control signals $CTRL_1$ through $CTRL_N$ alone. The direction of lasing in the ring laser 16 can be determinative of an amount of optical power that is coupled into the output waveguide 14. For example, if a given ring laser 16 lases unidirectionally, but in the opposite direction of the optical output signal $OPT_{OUT}$, then the optical power of the respective one of the ring laser optical signals $OPT_1$ through $OPT_N$ is not added to the optical output signal $OPT_{OUT}$. Similarly, if a given ring laser 16 lases bidirectionally, then the amount of optical power of the respective one of the ring laser optical signals $OPT_1$ through $OPT_N$ that is added to the optical output signal $OPT_{OUT}$ may not be sufficient, and the optical power of the respective one of the ring laser optical signals $OPT_1$ through $OPT_N$ that is provided in the opposite direction of the optical output signal $OPT_{OUT}$ is wasted.

Therefore, to ensure that the ring laser 16 in each of the ring laser systems 12 lases unidirectionally in the same direction as the optical output signal $OPT_{OUT}$, each of the ring laser systems 12 can utilize the local waveguide 18. As described previously, the ring laser 16 in each of the ring laser systems 12 is optically coupled to the respective local waveguide 18. Therefore, a second portion of the respective one of the ring laser optical signals $OPT_1$ through $OPT_N$ can be coupled into the local waveguide 18. The ring laser system 12 can thus be configured to control a phase of the second portion of the respective one of the ring laser optical signals $OPT_1$ through $OPT_N$ to provide constructive interference of the second portion of the respective one of the ring laser optical signals $OPT_1$ through $OPT_N$ with respect to the respective one of the ring laser optical signals $OPT_1$ through $OPT_N$ resonating within the ring laser 16 at a respective optical coupling therebetween. As an example, the ring laser systems 12 can each include a reflector at an end of the local waveguide corresponding to the opposite lasing direction of the respective one of the ring laser optical signals $OPT_1$ through $OPT_N$ with respect to the optical output signal $OPT_{OUT}$. Therefore, the ring laser system 12 can ensure that optical energy that is provided in the opposite lasing direction of the respective one of the ring laser optical signals $OPT_1$ through $OPT_N$ with respect to the optical output signal $OPT_{OUT}$ (e.g., either based on bidirectional lasing or opposite unidirectional lasing) can be reflected and coupled back into the ring laser 16 in a manner that forces unidirectional lasing in the same direction as the optical output signal $OPT_{OUT}$ based on the constructive interference.

In the example of FIG. 1, the optical output signal $OPT_{OUT}$ is provided to an optical receiver 22 that includes at least one receiver photodetector 24. As an example, the optical receiver 22 can include a demultiplexer that can separate the optical output signal $OPT_{OUT}$ into the separate first portions of the ring laser optical signals $OPT_1$ through $OPT_N$ (e.g., based on wavelength). Therefore, the photodetector(s) 24 can monitor the intensity of each of the first portions of the ring laser optical signals $OPT_1$ through $OPT_N$ that were coupled into the output waveguide 14. In response to monitoring the intensity of the first portions of the ring laser optical signals $OPT_1$ through $OPT_N$, the optical receiver 22 can provide a feedback signal $FDBK_{OPT}$ to the control system 20 to indicate the respective intensities. In addition, the ring laser systems 12 can provide respective feedback signals $FDBK_1$ through $FDBK_N$ that can correspond to an intensity of the second portion of the respective ring laser optical signals $OTP_1$ through $OPT_N$ in the local waveguide 18. Therefore, the control system 20 can be configured to control the ring laser systems 12 based on the feedback signal $FDBK_{OPT}$ and the feedback signals $FDBK_1$ through $FDBK_N$.

As an example, in response to the feedback signal $FDBK_{OPT}$ indicating that the first portion of a given one of the ring laser optical signals $OPT_1$ through $OPT_N$ has an intensity that is less than a predetermined threshold (e.g., an intensity of approximately zero), the control system 20 can identify that the respective one of the ring laser optical signals $OPT_1$ through $OPT_N$ is not being coupled into the output waveguide 14 as part of the optical output signal $OPT_{OUT}$. Thus, in response to the respective one of the feedback signals $FDBK_1$ through $FDBK_N$ indicating that the second portion of the respective one of the ring laser optical signals $OPT_1$ through $OPT_N$ has an intensity that is less than a predetermined threshold (e.g., an intensity of approximately zero), the control system 20 can identify that the ring laser 16 of the respective ring laser system 12 is not operational based on a substantially complete lack of coupling of optical energy in each of the output waveguide 14 and the local waveguide 18.

However, in response to the respective one of the feedback signals $FDBK_1$ through $FDBK_N$ indicating that the second portion of the respective one of the ring laser optical signals $OPT_1$ through $OPT_N$ has an intensity that is greater than a predetermined threshold (e.g., non-zero intensity), then the control system 20 can identify that the ring laser 16 is not being lased completely in the correct direction. For example, such an indication can be based on the ring laser 16 lasing either bidirectionally or unidirectionally opposite the direction of the optical output signal $OPT_{OUT}$. Therefore, the control system 20 can provide phase control of the second portion of the respective ring laser optical signal $OPT_1$ through $OPT_N$ in the local waveguide 18 (e.g., via a control signal in the respective one of the sets of control signals $CTRL_1$ through $CTRL_N$) to facilitate unidirectional lasing in the correct direction.

Figure 2:
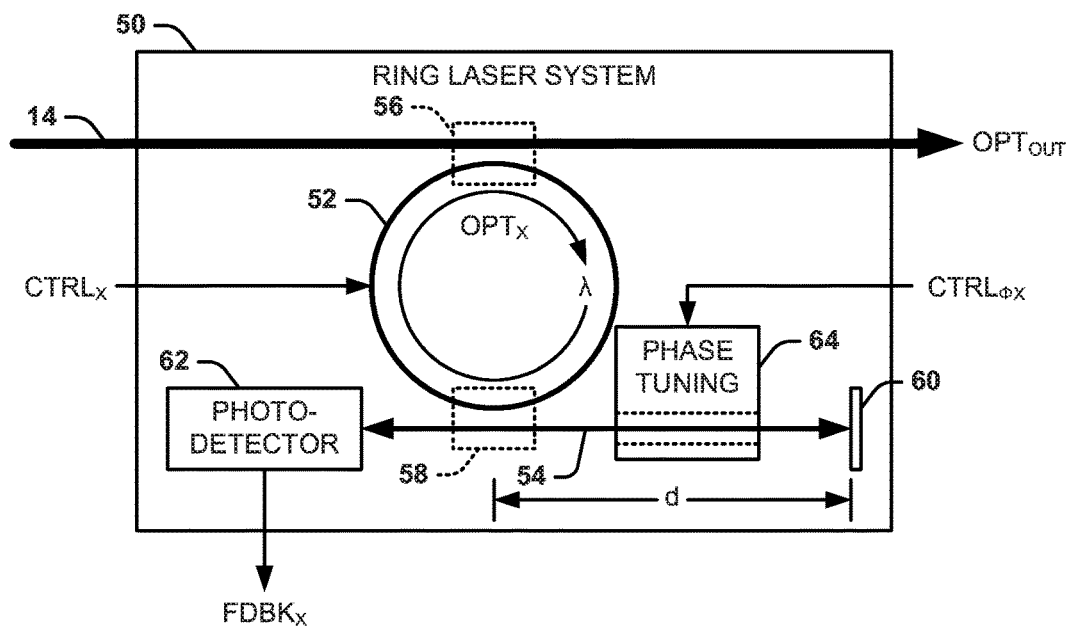
FIG. 2 illustrates an example of a ring laser system.

FIG. 2 illustrates an example of a ring laser system 50. The ring laser system 50 can correspond to one of the ring laser systems 12 in the example of FIG. 1. Therefore, reference is to be made to the example of FIG. 1 in the following description of the example of FIG. 2.

The ring laser system 50 includes a ring laser 52 and a local waveguide 54. The ring laser 52 is demonstrated in the example of FIG. 2 as being evanescently coupled to the output waveguide 14 on which the optical output signal $OPT_{OUT}$ propagates at a coupling 56, and as being evanescently coupled to the local waveguide 54 at a coupling 58. The ring laser 52 receives a control signal $CTRL_X$, where X corresponds to a given one of the plurality N in the example of FIG. 1, to facilitate lasing to generate a ring laser optical signal $OPT_X$, such that a first portion of the ring laser optical signal $OPT_X$ is coupled into the output waveguide 14 via the coupling 56 and a second portion of the ring laser optical signal $OPT_X$ is coupled into the local waveguide 54 via the coupling 58. As an example, the coupling 58 can be such that the optical energy of the second portion of the ring laser optical signal $OPT_X$ is significantly small compared to the optical energy of the first portion of the ring laser optical signal $OPT_X$, such as to conserve power. The ring laser 52 is demonstrated as being dimensioned to generate the ring laser optical signal $OPT_X$ at a wavelength λ. In the example of FIG. 2, the ring laser optical signal $OPT_X$ is demonstrated as lasing unidirectionally in a clockwise direction, and thus in the same direction as the optical output signal $OPT_{OUT}$. As described herein, the ring laser system 50 can be configured to facilitate the lasing of the ring laser 52 in the clockwise direction to provide substantially efficient coupling of the ring laser optical signal $OPT_X$ as part of the optical output signal $OPT_{OUT}$.

As described previously, if the ring laser optical signal $OPT_X$ lases in bidirectionally or unidirectionally in the counter-clockwise direction, then the ring laser optical signal $OPT_X$ is not efficiently coupled (or coupled at all) to the optical output signal $OPT_{OUT}$. Thus, the ring laser system 50 includes a reflector 60 at a first end of the local waveguide 54, a photodetector 62 at a second end of the local waveguide 54 opposite the reflector 60, and a phase tuning element 64 located between the reflector 60 and the coupling 58 and through which local waveguide 54 passes. The photodetector 62 is configured to monitor an intensity of the second portion of the ring laser optical signal $OPT_X$ and to generate a feedback signal $FDBK_X$ that is indicative of the intensity. For example, the photodetector 62 can be configured as a photodiode having a P-channel and an N-channel. In the example of FIG. 2, the coupling 58 and the reflector 60 are spaced apart along the local waveguide 54 by a distance "d", which can be a distance that is predetermined at a time of fabrication of the ring laser system 50.

As an example, the distance "d" can correspond to an expected distance at which the second portion of the ring laser optical signal $OPT_X$ can be reflected from the reflector 60 and can be coupled back into the ring laser 52 via the coupling 58 to provide constructive interference with respect to the ring laser optical signal $OPT_X$ propagating in the ring laser 52 at the coupling 58. Thus, in response to the ring laser 52 lasing bidirectionally or unidirectionally in the counter-clockwise direction, the second portion of the ring laser optical signal $OPT_X$ can be coupled to the local waveguide to propagate toward the reflector 60, and thus be reflected back to coupling 58. If the reflected lasing signal constructively interferes with a lasing signal in the laser cavity at the coupling 58, it can re-enter the laser cavity to break an optical gain balance between the two possible lasing directions. Accordingly, the constructive interference can force the lasing of the ring laser 52 to the clockwise direction to maximize the coupling of the first portion of the ring laser optical signal $OPT_X$ into the output waveguide 14. However, a variety of factors, such as fabrication tolerance factors and/or environmental (e.g., temperature) factors, can result in an error in the distance "d", such as resulting in a coupling of the second portion of the ring laser optical signal $OPT_X$ not providing constructive interference of the ring laser optical signal $OPT_X$ propagating in the ring laser 52 at the coupling, and thus scattering the reflected second portion of the of the ring laser optical signal to $OPT_X$ to prohibit it from re-entering the ring laser 52 via the coupling 58.

Therefore, to ensure that the ring laser 52 lases unidirectionally in the clockwise direction, and thus the same direction as the optical output signal $OPT_{OUT}$, the phase tuning element 64 can be implemented to adjust a phase of the second portion of the ring laser optical signal $OPT_X$ that propagates in the local waveguide 54. Therefore, the effective distance "d" can be adjusted based on the controlled phase of the second portion of the ring laser optical signal $OPT_X$, such that the constructive interference of the second portion of the ring laser optical signal $OPT_X$ at the coupling 58 can be substantially optimized, thus forcing the ring laser 52 to be lased in the clockwise direction. In the example of FIG. 2, the phase tuning element 64 is demonstrated as controlled via a control signal $CTRL_{\phi X}$, such as provided from the control system 20 in the example of FIG. 1 and in response to the feedback signal $FDBK_{OPT}$ and the feedback signal $FDBK_X$ that is provided from the photodetector 62. As an example, the phase tuning element 64 can be configured as a diode (e.g., a pin diode) having a P-channel and an N-channel, and being configured to inject electrical carriers into the local waveguide 54 in response to the control signal $CTRL_{\phi X}$ to change a refractive index of the portion of the local waveguide that passes through the phase tuning element 64. Therefore, the change to the refractive index of the portion of the local waveguide 54 can change the phase of the second portion of the ring laser optical signal $OPT_X$ that propagates to/from the reflector 60.

As an example, the feedback signal $FDBK_{OPT}$ (e.g., provided from the optical receiver 22 in the example of FIG. 1) can indicate that the first portion of the ring laser optical signals $OPT_X$ in the optical output signal $OPT_{OUT}$ has an intensity that is less than a predetermined threshold (e.g., an intensity of approximately zero). Thus, the control system 20 can identify that the ring laser optical signal $OPT_X$ is not being coupled into the output waveguide 14 as part of the optical output signal $OPT_{OUT}$. Thus, if the feedback signal $FDBK_X$ also indicates that the second portion of the ring laser optical signal $OPT_X$ has an intensity that is less than a predetermined threshold (e.g., an intensity of approximately zero), the control system 20 can identify that the ring laser 52 is not operational based on a substantially complete lack of coupling of optical energy in each of the output waveguide 14 and the local waveguide 54. However, if the feedback signal $FDBK_X$ indicates that the second portion of the ring laser optical signal $OPT_X$ has an intensity that is greater than a predetermined threshold (e.g., non-zero intensity), then the control system 20 can identify that the ring laser 52 is not being lased in the clockwise direction, and is thus either lasing bidirectionally or unidirectionally in the counter-clockwise direction. Therefore, the control signal $CTRL_{\phi X}$ can control the phase of the second portion of the ring laser optical signal $OPT_X$ via the phase tuning element 64 to provide the constructive interference of the second portion of the ring laser optical signal $OPT_X$ with the ring laser optical signal $OPT_X$ propagating in the ring laser 52 at the coupling 58 to facilitate unidirectional lasing in the clockwise direction.

Figure 3:
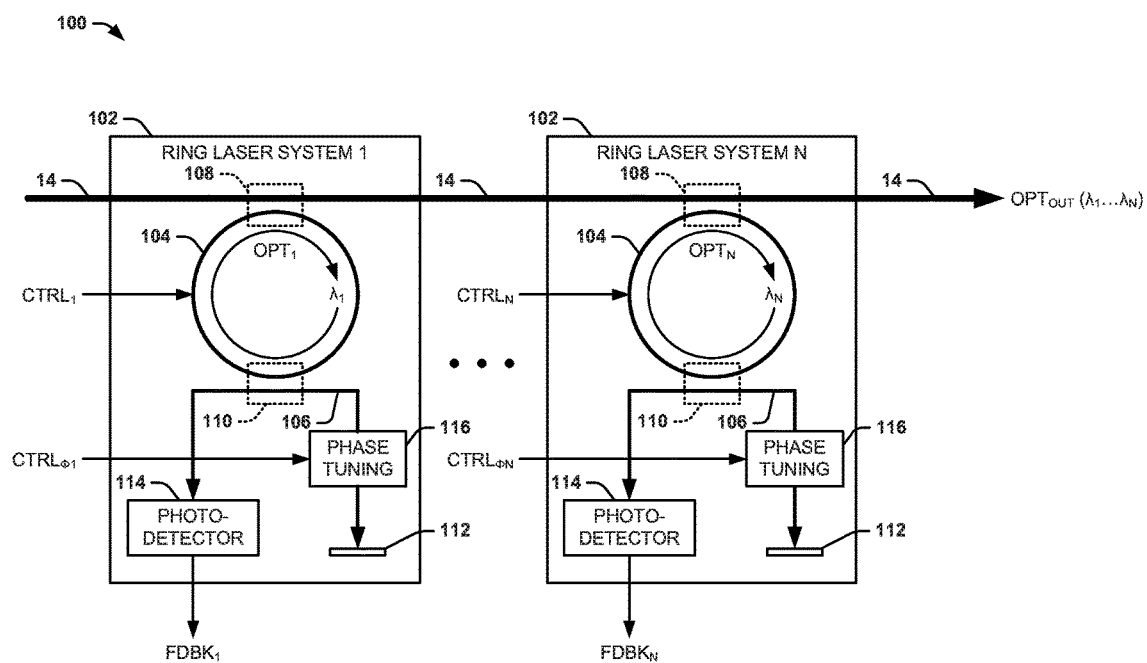
FIG. 3 illustrates another example of an optical system.

FIG. 3 illustrates another example of an optical system 100. The optical system 100 includes a plurality N of ring laser systems 102, where N is a positive integer, that can each be configured substantially similar to the ring laser system 50. Therefore, reference is to be made to the example of FIGS. 1 and 2 in the following description of the example of FIG. 3.

The ring laser systems 102 each include a ring laser 104 and a local waveguide 106. The ring laser 104 of each of the ring laser systems 102 is demonstrated in the example of FIG. 2 as being evanescently coupled to the output waveguide 14 on which the optical output signal $OPT_{OUT}$ propagates at a coupling 108, and as being evanescently coupled to the local waveguide 106 at a coupling 110. The ring lasers 104 receive respective control signals $CTRL_1$ through $CTRL_N$ to facilitate lasing to generate respective ring laser optical signals $OPT_1$ through $OPT_N$. Thus, similar to as described in the example of FIG. 2, a first portion of the ring laser optical signals $OPT_1$ through $OPT_N$ is coupled into the output waveguide 14 via the couplings 108 and a second portion of the ring laser optical signals $OPT_1$ through $OPT_N$ is coupled into the local waveguides 106 via the couplings 110. The ring lasers 104 are each demonstrated as being dimensioned to generate the respective ring laser optical signals $OPT_1$ through $OPT_N$ at respective wavelengths $\lambda_1$ through $\lambda_N$, which can all be distinct with respect to each other.

Each of the ring laser systems 102 includes a reflector 112 at a first end of the local waveguide 106, a photodetector 114 at a second end of the local waveguide 106 opposite the reflector 112, and a phase tuning element 116 located between the reflector 112 and the coupling 110 and through which local waveguide 106 passes. The photodetector 114 is configured to monitor an intensity of the second portion of the respective one of the ring laser optical signals $OPT_1$ through $OPT_N$ and to generate a respective one of feedback signals $FDBK_1$ through $FDBK_N$ that is indicative of the intensity.

In the example of FIG. 3, the coupling 110 and the reflector 112 are spaced apart along the local waveguide 106 in each of the ring laser systems 102 by a distance "d", which can be a distance that is predetermined and substantially the same at a time of fabrication of the ring laser systems 102. However, the phase tuning element 116 in each of the ring laser systems 102 can be controlled individually based on respective control signals $CTRL_{\phi 1}$ through $CTRL_{\phi N}$, such as similar to the manner described previously in the example of FIG. 2. For example, the effective distance "d" can be adjusted in each of the ring laser systems 102 in response to the feedback signal $FDBK_{OPT}$ and the respective one of the feedback signals $FDBK_1$ through $FDBK_N$, such as described previously in the example of FIG. 2. As an example, the phase tuning elements 116 can be configured as a diode to inject electrical carriers into the local waveguide in response to the respective one of the control signals $CTRL_{\phi 1}$ through $CTRL_{\phi N}$ to change a refractive index of the portion of the local waveguide 106 that passes through the respective phase tuning element 116. Therefore, the change to the refractive index of the portion of the local waveguide 106 can change the phase of the second portion of the respective one of the ring laser optical signals $OPT_1$ through $OPT_N$ that propagates to/from the respective reflector 112 in each of the ring laser systems 12.

Accordingly, the control signals $CTRL_{\phi 1}$ through $CTRL_{\phi N}$ can control the phase of the second portion of the ring laser optical signals $OPT_1$ through $OPT_N$ via the respective phase tuning elements 116 in each of the ring laser systems 102 individually to provide the constructive interference of the second portion of the ring laser optical signals $OPT_1$ through $OPT_N$ with the respective ring laser optical signals $OPT_1$ through $OPT_N$ propagating in the ring lasers 104 at the coupling 110. Therefore, the control system 20 can facilitate unidirectional lasing in the clockwise direction for all of the ring lasers 104 based on individual adjustments to the effective distance "d" in each of the ring laser systems 102 via the control signals $CTRL_{\phi 1}$ through $CTRL_{\phi N}$. Such individual control of the effective distance "d" to provide the individual constructive interference, and thus unidirectional lasing of the ring lasers 104 in the clockwise directions, can provide a highly efficient coupling of the first portion of each of the ring laser optical signals $OPT_1$ through $OPT_N$ to the output waveguide 14, and thus the optical output signal $OPT_{OUT}$, relative to typical ring laser array systems, such as implementing a common reflector on a proximal end of a corresponding output optical waveguide. Accordingly, each of the channels of the optical output signal $OPT_{OUT}$ corresponding to the respective ring laser optical signals $OPT_1$ through $OPT_N$ can be provided at an efficient optical power in the optical output signal $OPT_{OUT}$.

Figure 4:
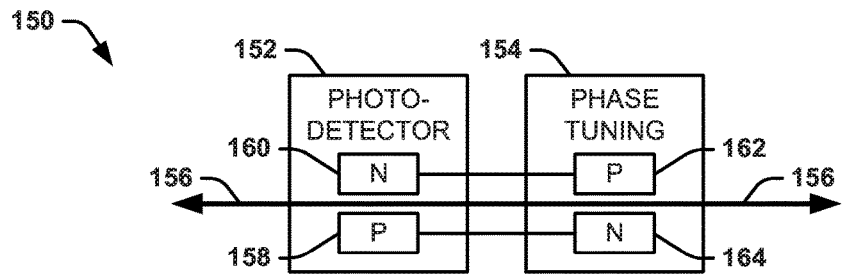
FIG. 4 illustrates another example of a ring laser system.

FIG. 4 illustrates another example of a ring laser system 150. The ring laser system 150 can correspond to a portion of the ring laser system 50 in the example of FIG. 2 and/or one of the ring laser systems 102 in the example of FIG. 3. Therefore, reference is to be made to the examples of FIGS. 1-3 in the following description of the example of FIG. 4.

The ring laser system 150 includes a photodetector 152 and a phase tuning element 154 through which a local waveguide 156 passes. Similar to as described previously, the photodetector 152 and the phase tuning element 154 are each configured as diodes (e.g., pin diodes). The photodetector 152 includes a P-channel anode 158 and an N-channel cathode 160 that are arranged opposite the local waveguide 156, and the phase tuning element 154 includes a P-channel anode 162 and an N-channel cathode 164 that are arranged opposite the local waveguide 156. As an example, the photodetector 152 and/or the phase tuning element 154 can be configured as a group III-V device or a silicon defect device.

In response to an applied forward bias on the PN junction of the phase tuning element 154 that is formed by the anode 162 and the cathode 164, such as in response to the control signal $CTRL_{\phi X}$, electrical carriers (e.g., holes and electrons) can be injected into local waveguide 156. In response to photons in the local waveguide 156, electrical carriers (e.g., holes and electrons) can be depleted from the local waveguide 156, such that the holes can migrate to the cathode 160 and electrons can migrate to the anode 158. The photodetector 152 can operate with substantially zero bias applied to the anode 158 and the cathode 160. However, application of a reverse bias with respect to the anode 158 and the cathode 160 can result in enhanced responsivity and speed. Therefore, in the example of FIG. 4, the anode 162 of the phase tuning element 154 is electrically coupled to the cathode 160 of the photodetector 152, and the cathode 164 of the phase tuning element 154 is electrically coupled to the anode 158 of the photodetector 152. Therefore, a forward bias applied to the PN junction of the phase tuning element 154 results in a reverse bias applied to the PN junction of the photodetector 152. Accordingly, in response to the control signal $CTRL_{\phi X}$ that forward biases the phase tuning element 154, the speed and responsivity of the photodetector 152 substantially increases. As a result, the feedback signal $FDBK_X$ can be provided in a much more rapid and accurate manner for correcting the direction of the lasing of the associated ring laser of the ring laser system 150 to provide unidirectional lasing in the same direction as the optical output signal $OPT_{OUT}$.

Figure 5:
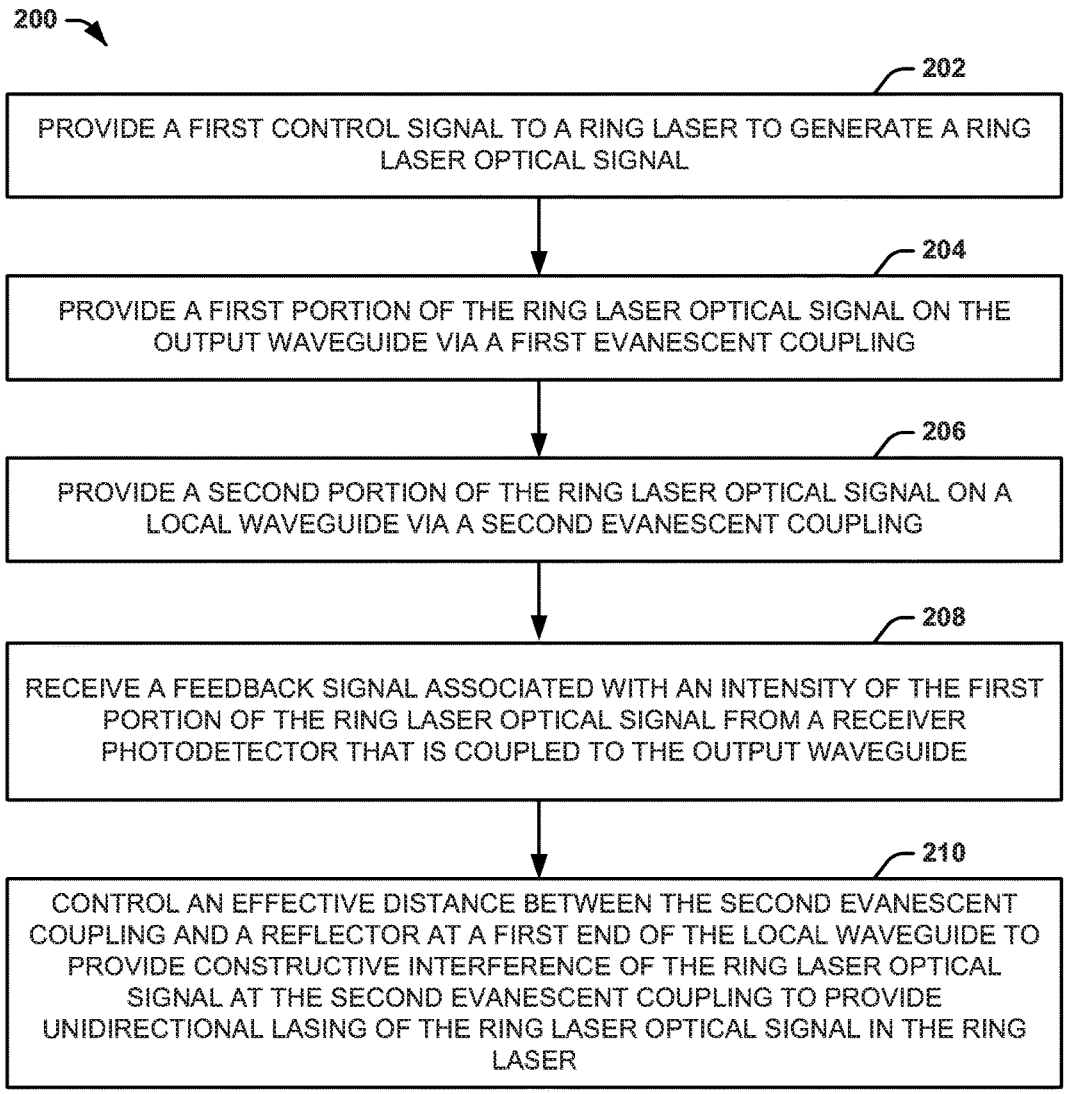
FIG. 5 illustrates an example method for generating an optical output signal on an output waveguide.

In view of the foregoing structural and functional features described above, an example method that can implemented will be better appreciated with reference to FIG. 5. While, for purposes of simplicity of explanation, the methodology of FIG. 5 are shown and described as executing serially, it is to be understood and appreciated that the method is not limited by the illustrated order, as some aspects could, in other embodiments, occur in different orders and/or concurrently with other aspects from that shown and described herein. Moreover, not all illustrated features may be required to implement a method.

FIG. 5 illustrates a method 200 for generating an optical output signal (e.g., the optical output signal $OPT_{OUT}$) on an output waveguide (e.g., the output waveguide 14). At 202, a first control signal (e.g., the control signal $CTRL_X$) is provided to a ring laser (e.g., the ring laser 16) to generate a ring laser optical signal (e.g., the ring laser optical signal $OPT_X$). At 204, a first portion of the ring laser optical signal is provided on the output waveguide via a first evanescent coupling (e.g., the coupling 56). At 206, a second portion of the ring laser optical signal is provided on a local waveguide via a second evanescent coupling (e.g., the coupling 58). At 208, a feedback signal (e.g., the feedback signal $FDBK_X$) associated with an intensity of the first portion of the ring laser optical signal is received from a receiver photodetector (e.g., one of the photodetector(s) 24) that is coupled to the output waveguide. At 210, an effective distance (e.g., the distance "d") between the second evanescent coupling and a reflector (e.g., the reflector 60) at a first end of the local waveguide is controlled to provide constructive interference of the ring laser optical signal at the evanescent coupling to provide unidirectional lasing of the ring laser optical signal in the ring laser (e.g., in the same direction as the optical output signal $OPT_{OUT}$).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An optical system comprising:
   an output waveguide to propagate an optical output signal; and
   a plurality of ring laser systems, each of the plurality of ring laser systems comprising:
   a ring laser to generate a ring laser optical signal,
   a local waveguide coupled to the ring laser at a coupling location,
   a reflector at a first end of the local waveguide;
   a photodetector at a second end of the local waveguide; and
   a phase tuning element between the photodetector and the coupling location through which the local waveguide passes;
   the ring laser being optically coupled to the output waveguide to provide a first portion of the ring laser optical signal on the output waveguide as part of the optical output signal and being optically coupled to the local waveguide to provide a second portion of the ring laser optical signal on the local waveguide, each of the plurality of ring laser systems is to control a phase of the second portion of the ring laser optical signal to provide constructive interference with the ring laser optical signal at an optical coupling of the ring laser and the local waveguide.

2. The system of claim 1, wherein for each of the plurality of ring laser systems:
   the phase tuning element is to adjust a refractive index of a portion of the local waveguide in response to a control signal to control the phase of the second portion of the ring laser optical signal; and the photodetector is to monitor an optical power of the second portion of the ring laser optical signal to indicate whether the ring laser is operational and providing unidirectional lasing.

3. The system of claim 2, wherein each of the phase tuning element and the photodetector are configured, respectively, as diodes having a anode and an cathode, wherein the anode of the phase tuning element is electrically coupled to the cathode of the photodetector, and wherein the cathode of the phase tuning element is electrically coupled to the anode of the photodetector to set a reverse bias voltage associated with the photodetector.

4. The system of claim 2, wherein the control signal is provided in response to a feedback signal provided from a receiver photodetector that is optically coupled to the output waveguide and is to monitor an intensity of the first portion of the ring laser optical signal in the optical output signal.

5. The system of claim 4, wherein the control signal is provided to control the phase of the second portion of the ring laser optical signal in response to the photodetector determining that an optical power of the second portion of the ring laser optical signal is above a first predetermined threshold and the receiver photodetector determining that an optical power of the first portion of the ring laser optical signal is less than a second predetermined threshold.

6. The system of claim 1, wherein the reflector is arranged a distance from the coupling location and is to reflect the second portion of the ring laser optical signal back to the ring laser.

7. The system of claim 6, wherein each of the plurality of ring laser systems is to control the phase of the second portion of the ring laser optical signal to adjust the distance to provide the constructive interference with the ring laser optical signal at the optical coupling to facilitate the unidirectional lasing.

8. A method for generating an optical output signal on an output waveguide, the method comprising:
providing a first control signal to a ring laser to generate a ring laser optical signal;
providing a first portion of the ring laser optical signal on the output waveguide via a first evanescent coupling;
providing a second portion of the ring laser optical signal on a local waveguide via a second evanescent coupling;
receiving a feedback signal associated with an intensity of the first portion of the ring laser optical signal from a receiver photodetector that is coupled to the output waveguide; and
controlling an effective distance between the second evanescent coupling and a reflector at a first end of the local waveguide to provide constructive interference of the second portion of the ring laser optical signal with the ring laser optical signal at the second evanescent coupling to provide unidirectional lasing of the ring laser optical signal in the ring laser;
wherein controlling the effective distance between the second evanescent coupling and the reflector comprises controlling a phase of the second portion of the ring laser optical signal using a phase tuning element through which the local waveguide passes.

9. The method of claim 8, wherein controlling the phase of the second portion of the ring laser optical signal comprises providing a second control signal in response to the feedback signal to adjust a refractive index of a portion of the local waveguide.

10. The method of claim 8, further comprising monitoring an optical power of the second portion of the ring laser optical signal via a photodetector arranged at a second end of the local waveguide opposite the reflector to indicate whether the ring laser is operational and providing the unidirectional lasing.

11. An optical system comprising:
an output waveguide to propagate an optical output signal; and
a plurality of ring laser systems, each of the plurality of ring laser systems comprising:
a local waveguide;
a ring laser to generate a ring laser optical signal, the ring laser being evanescently coupled to the output waveguide to provide a first portion of the ring laser optical signal as a portion of the optical output signal, and being evanescently coupled to the local waveguide at a coupling location to provide a second portion of the ring laser optical signal on the local waveguide;
a phase tuning element through which the local waveguide passes and located between the coupling location and a reflector at a first end of the local waveguide, the phase tuning element to adjust a refractive index of a portion of the local waveguide in response to a control signal to control a phase of the second portion of the ring laser optical signal to provide constructive interference with the ring laser optical signal at the coupling location to facilitate unidirectional lasing of the ring laser; and
a photodetector at a second end of the local waveguide to monitor an optical power of the second portion of the ring laser optical signal to indicate whether the ring laser is operational and providing the unidirectional lasing.

12. The system of claim 11, wherein each of the phase tuning element and the photodetector are configured, respectively, as diodes having a anode and an cathode, wherein the anode of the phase tuning element is electrically coupled to the cathode of the photodetector, and wherein the cathode of the phase tuning element is electrically coupled to the anode of the photodetector to set a reverse bias voltage associated with the photodetector.

13. The system of claim 11, wherein the control signal is provided in response to a feedback signal provided from a receiver photodetector that is optically coupled to the output waveguide and is to monitor an intensity of the first portion of the ring laser optical signal in the optical output signal, the control signal being provided to control the phase in response to the photodetector determining that an optical power of the second portion of the ring laser optical signal is above a first predetermined threshold and the receiver photodetector determining that an optical power of the first portion of the ring laser optical signal is less than a second predetermined threshold.

14. The system of claim 11, wherein for each of the plurality of ring laser systems, the reflector is to reflect the second portion of the ring laser optical signal back to the ring laser, and wherein each of the plurality of ring laser systems is to control the phase of the second portion of the ring laser optical signal to adjust an effective distance between the reflector and the evanescent coupling to provide the constructive interference of the ring laser optical signal in the ring laser to facilitate the unidirectional lasing.

* * * * *